United States Patent
Belinky et al.

[11] Patent Number: 5,904,261
[45] Date of Patent: *May 18, 1999

[54] ENCLOSURES AND MOUNTING BOX FOR A TRAILER HITCH ELECTRICAL CONNECTOR

[75] Inventors: Jacob S. Belinky, Carleton; David L. Rogers, Canton, both of Mich.

[73] Assignee: Draw-Tite, Inc., Canton, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/692,509

[22] Filed: Aug. 6, 1996

[51] Int. Cl.⁶ .................................................. H02G 3/08
[52] U.S. Cl. .................................................. 220/3.9
[58] Field of Search .............................. 220/3.2, 3.3, 3.9

[56] References Cited

U.S. PATENT DOCUMENTS

| | | |
|---|---|---|
| D. 254,846 | 4/1980 | Wood . |
| D. 273,778 | 5/1984 | Ruhland . |
| D. 332,942 | 2/1993 | Julien . |
| D. 345,145 | 3/1994 | Fogg et al. . |
| D. 358,370 | 5/1995 | Guppy . |
| 2,643,787 | 6/1953 | Rockman ................................. 220/3.2 |
| 2,878,301 | 3/1959 | Dierstein et al. .................... 220/3.2 X |
| 4,747,506 | 5/1988 | Stuchlik, III ............................. 220/3.9 |
| 4,781,393 | 11/1988 | Jeter . |
| 4,842,524 | 6/1989 | Hopkins et al. . |
| 5,288,094 | 2/1994 | Putnam . |
| 5,407,088 | 4/1995 | Jorgensen et al. ...................... 220/3.9 |
| 5,407,219 | 4/1995 | Chiu . |
| 5,443,389 | 8/1995 | Hughes . |

OTHER PUBLICATIONS

Hidden Hitch Ford Explorer Installation Instructions, Part #83607, Jul. 4, 1995.
Body Components, Underbody Components, Trailer Hitch, p. 25, 1993.
(3) photographs of a Trailer Hitch with Welded Electrical Connector Bracket (admitted prior art).

*Primary Examiner*—Steven Pollard
*Attorney, Agent, or Firm*—Leon E. Redman; Myron B. Kapustij

[57] ABSTRACT

A mounting box formed of polymeric material for mounting an electrical connector laterally to the cross tube of a trailer hitch with walls enclosing the body of the electrical connector receivable through a mounting wall opening with another opening receiving the cable of wires connected to the electrical connector. A pair of spaced apart slots formed in the mounting box through which an adjustable band clamp is received for encompassing the cross tube of the trailer hitch for rigidly securing the mounting box to the cross tube. Fastening holes are arranged about the first wall opening in a pattern that corresponds to different electrical connectors and different mounting positions of the electrical connector. A flap in the mounting wall permits the cable of a prewired electrical connector to be received within the mounting box.

20 Claims, 1 Drawing Sheet

ENCLOSURES AND MOUNTING BOX FOR A TRAILER HITCH ELECTRICAL CONNECTOR

FIELD OF THE INVENTION

The present invention relates to trailer hitch electrical connector mounts and in particular to a mounting box for enclosing and mounting an electrical connector to a trailer hitch.

BACKGROUND OF THE INVENTION

For towing a trailer with a trailer hitch an electrical connector is carried by a towing vehicle for communication of brake and turn signals from the towing vehicle to a trailer. Typically, the electrical connector loosely hangs from a cable or is mounted to either the towing vehicle or the trailer hitch by a bracket. U.S. Pat. No. 5,407,219 discloses such a mounting bracket which presents the electrical connector as aligned with the longitudinal axis of the towing vehicle and in the direction of travel of the towing vehicle and exposes the electrical connector to wear and damage resulting from water, streams of mud, dirt and road debris thrown up from the tires of the towing vehicle.

SUMMARY OF THE INVENTION

It would be most advantageous for a mount that readily and securely mounts an electrical connector to a trailer hitch while protecting the electrical connector from a hostile environment of the elements and road debris. The present invention provides such a mounting box for a trailer hitch electrical connector.

It is therefore an object of the present invention to provide for mounting an electrical connector to a trailer hitch which also provides protection from the hostile elements to which such an electrical connector may be exposed.

It is a further object of the invention to readily mount such a box to a trailer hitch.

It is yet a further object of the invention to provide a box which is inexpensive to manufacture yet meets the above objects.

These and various other objects and advantages are achieved by the present invention as will be apparent from the following specification, drawings and claims.

DESCRIPTION OF THE PREFERRED EMBODIMENT

Figure 1:
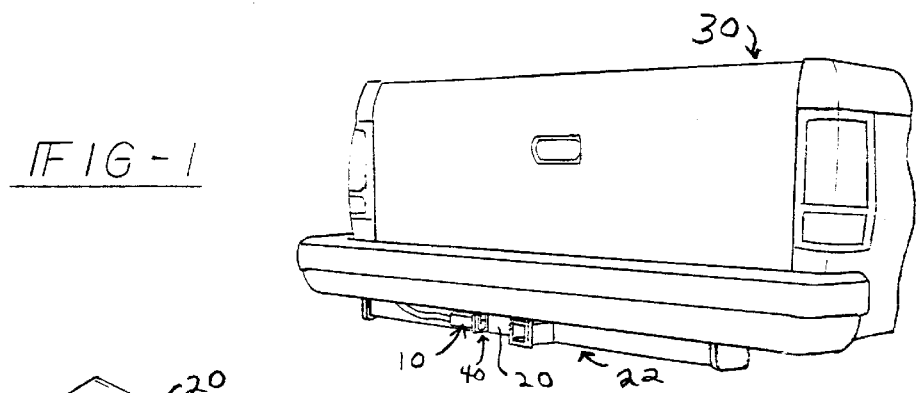
FIG. 1 is a perspective of the mounting box of the present invention mounting an electrical connector to a trailer hitch at the rear of a vehicle.
Figure 2:
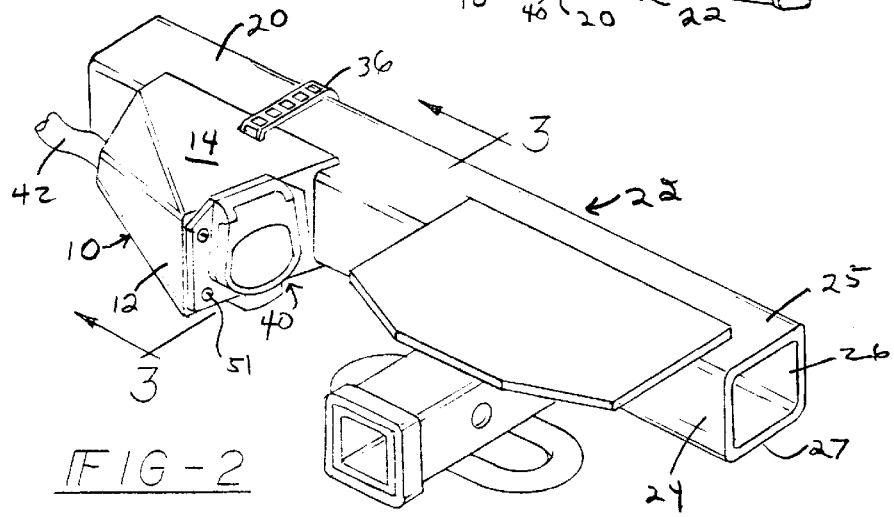
FIG. 2 is an enlarged perspective view of the mounting box of FIG. 1 on a fragmented portion of a trailer hitch cross tube.
Figure 3:
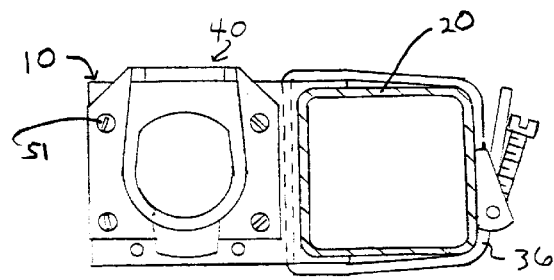
FIG. 3 is a cross-sectional view taken along lines 3—3 of FIG. 2.

Referring to FIGS. 1–4 a mounting box 10 formed with a polymeric material mounts on a cross tube 20 of a conventional trailer hitch 22 extending laterally across and secured to the underside of a vehicle 30 at its rearward end. In the preferred embodiment the mounting box 10 is injection molded with a high density polyethylene. The cross tube 20 typically is substantially rectangular or square in cross-sectional configuration with front, top, rear and bottom sides 24, 25, 26 and 27, respectively. Unlike a metal bracket the present box 10 molded with a polymeric material will not rust or corrode.

Figure 4:
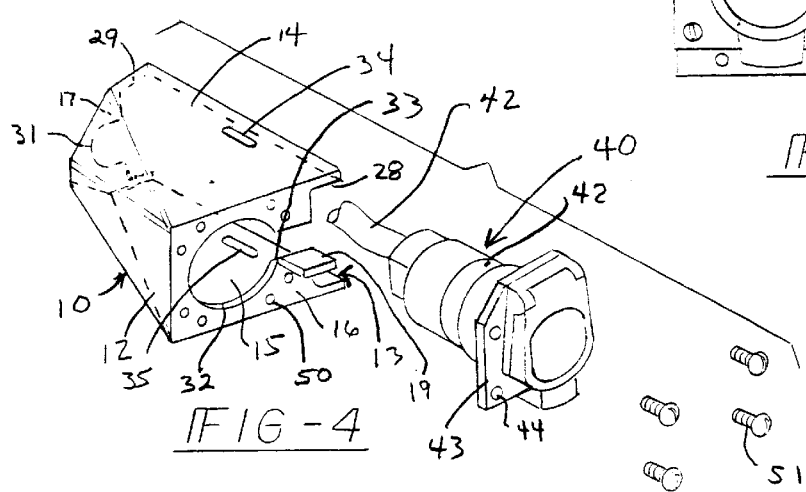
FIG. 4 is an exploded view of the mounting box and electrical connector to be mounted therein.

The mounting box 10 encloses and mounts an electrical connector 40 to the cross tube 20 as will be explained in greater detail below. The mounting box 10 includes a front wall 12, top wall 14, bottom wall 15, right wall 16 and left wall 17 as best shown in FIG. 4. Walls 12, 14, 15, 16 and 17 of the box 10 is formed into basically a five sided enclosure with an opening 13 at the rear side of the box 10 which opening 13 is sized and configured to conform with the front wall 24 of the cross tube 20. Openings 28 and 29 are formed at the rearward end of wall 16 and 17, respectively. The openings 28 and 29 conform to the shape of cross tube 20. While in the preferred embodiment the openings 28 and 29 are generally C-shaped to conform to the generally rectangular cross sectional shape of the cross tube 20, the openings 28 and 29 could be arcuate to conform to a cross tube having a circular cross section. A cutout opening 31 is provided at the rear of wall 17 to receive a multi-wired cable 42 connected to electrical connector 40. A circular cutout or opening 32 is formed through wall 16 to receive the body 42 of electrical connector 40.

Means such as parallel notches 33 or score lines may be formed in wall 16 between cutout 32 and opening 28 to enable a hinged flap 19 to be formed therein to permit an electrical connector 40 having a permanently prewired cable 42 attached thereto to be received within the interior of box 10. The hinged flap 19 is closed after such prewired cable 42 of electrical connector 40 is positioned within the interior of box 10 and opening 32. A plurality of fastener holes 50 are provided in wall 16 in a pattern that corresponds with a standard pattern of mounting holes 44 in a mounting flange 43 of a conventional trailer hitch electrical connector 40. The connector shown in FIGS. 1–4 is a standard 7-way connector. The pattern of holes 50 in wall 16 permit such a 7-way connector to be mounted thereto via fasteners or screws 51 in the orientation shown or any other orientation possible by a 90° rotation of the electrical connector 40 relative thereto. The pattern of holes 50 permit a standard 6-way electrical connector (not shown) to be mounted on diagonally disposed holes 50 in a desired orientation via screws 51. Opposing slots 34, 35 are formed through the walls 14, 15, respectively, adjacent the rear edge thereof. A tension member 36 such as a screw adjustable hose clamp type band is inserted through slots 34, 35 and encompasses cross tube 20 to secure the mounting box 10 thereto.

The box 10 encloses the body 42 of the electrical connector 40 and securely mounts electrical connector 40 to a lateral structural member 20 of trailer hitch 22 transverse to the direction of travel of vehicle 30 and thus protects the electrical connector 40 from hostile elements, damage and wear that otherwise could result from streams of water, mud, dirt and road debris kicked up from underneath vehicle 30. The box 10 is firmly and rigidly secured in a stationary position and resists the forces incident to the connection and disconnection of a mating trailer electrical connector (not shown) with the electrical connector 40. The result is an attractive and secure installation whereby the towing vehicle electrical connector 40 may be conveniently, securely and rigidly mounted on a trailer hitch 22 or other structural member of the towing vehicle 30 that facilitates connection and disconnection of a trailer end mating connector. Furthermore, box 10 accommodates an electrical connector 40 that is prewired to the vehicle 30 without splicing, disconnection or other disruption to the wires in cable 42.

Variations of the above described invention are possible without departing from the spirit and scope of the following claims. For example, the portion of walls 14 and 15 which engage the opposite sides of the cross tube 20 could be offset outwardly to conform to a larger cross tube. For trailer hitch with a drop mounted center section the box 10 can be mounted to the lower surface 27 of the cross tube rather than the front surface 24. One or more drain holes could be provided in the mounting box 10.

Also, a rear wall could be added opposite wall 12 between walls 14 and 15 rather than using a surface 24 or 27 of the cross tube to close/open side 13 of box 10.

We claim:

1. A mounting box for mounting an electrical connector to a trailer hitch having a horizontally disposed cross tube which extends across the rear of a vehicle comprising:

an enclosure for enclosing the body of the electrical connector within said enclosure;

said enclosure provided with an open side disposed generally horizontally and sized and configured to conform with and matingly receive the outer surface of said horizontally disposed cross tube;

means for rigidly securing said mounting box to said horizontally disposed cross tube, said enclosure configured to completely encompass and enclose the body of said electrical connector by a combination of said enclosure and the outer surface of said horizontally disposed cross tube matingly received by said open side with said mounting box rigidly secured to said cross tube.

2. The mounting box of claim 1 provided with a first opening for receiving the body of said electrical connector and wherein said means for securing said box to said cross tube comprises slot means formed in said enclosure and an adjustable tension member extending through said slot means and about said cross tube.

3. The mounting box of claim 2 wherein said enclosure is provided with a second opening generally opposite and spaced from said first opening, said enclosure provided with a hinged flap in communication with said first opening for providing access to the interior of said mounting box for the wires connected to the electrical connector.

4. The mounting box of claim 1 including a plurality of fasteners and a plurality of fastener holes formed in said enclosure about the first opening, said fastener holes for receiving said fasteners to fasten said electrical connector to said mounting box.

5. The mounting box of claim 3 wherein said fastener holes are greater in number than the number of said fasteners and said fastener holes arranged about said first opening to facilitate fastening said electrical connector to said mounting box in any one of a plurality of different positions.

6. The mounting box of claim 1 wherein said enclosure is formed from a polymeric material.

7. A mounting box for mounting an electrical connector to a trailer hitch having a cross member which extends laterally across the rear of a vehicle comprising:

an enclosure provided with a first opening disposed generally horizontal and sized and configured to conform with and seat about the outer surface of said horizontally disposed cross tube, said enclosure provided with a second opening to receive the body of the electrical connector within said enclosure means, said enclosure also provided with a third opening to receive a plurality of wires extending from outside said enclosure to the connector received therein, and means for rigidly securing said mounting box to said cross tube with said mounting box extending laterally with respect to said vehicle, said enclosure configured to completely enclose and encompass the body of said electrical connector by a combination of said enclosure and the outer surface of said generally horizontally disposed cross tube seated within said first opening.

8. The mounting box of claim 7 wherein said securing means comprises a pair of spaced apart slots formed in said enclosure means, and an adjustable band extending through said slots and about said cross tube.

9. The mounting box of claim 7 including a plurality of fasteners and a plurality of fastener holes formed about said second opening for receiving said plurality of fasteners to fasten said electrical connector to said mounting box.

10. The mounting box of claim 9 wherein said fastener holes are arranged about said second opening in a pattern which provides for fastening said electrical connector to said mounting box in any one of a plurality of different positions.

11. The mounting box of claim 9 wherein said fastener holes are arranged about said second opening in a pattern which provides for any one of a plurality of different electrical connectors to be fastened to said mounting box.

12. The mounting box of claim 7 wherein said enclosure includes a movable flap in communication with said second opening, said flap movable to an open position to provide access to the interior of the box for the wires extending to the electrical connector.

13. The mounting box of claim 12 wherein said enclosure is formed with a polymeric material.

14. A mounting box for enclosing and mounting an electrical connector to a trailer hitch having a cross tube member with a substantially rectangular cross section extending laterally across the rear of a vehicle comprising:

a first wall having an opening for receiving the body of the electrical connector;

a second wall disposed generally opposite said first wall and provided with an opening for receiving a plurality of wires connected to said electrical connector;

wall means for encompassing at least a substantial portion of the body of said electrical connector, said wall means extending between said first wall and said second wall;

means for rigidly securing said mounting box to said cross tube member;

said wall means together with said first wall and said second wall defining an open side of said mounting box, the open side having a configuration which conforms to the rectangular configuration of the cross tube for matingly receiving a plurality of sides of said rectangular cross tube for enclosing the body of said electrical connector by a combination of said open sided mounting box and said cross tube received within said open side of said mounting box with said mounting box rigidly secured to said cross tube member.

15. The mounting box of claim 14 wherein said means for securing said mounting box to said cross tube comprises at least one slot formed in said wall means and an adjustable band extending through said at least one slot and about said cross tube.

16. The mounting box of claim 14 including a plurality of fastener holes formed in said first wall for fastening said electrical connector to said mounting box.

17. The mounting box of claim 16 wherein said fastener holes are disposed about said opening in the first wall in a pattern which provides for fastening said electrical connector to said mounting box in any one of a plurality of different positions.

18. The mounting box of claim 17 wherein said fastener holes are arranged in a pattern that facilitates fastening any one of a plurality of different electrical connectors to said mounting box.

19. The mounting box of claim 14 wherein said first wall includes a wall flap provided access to the interior of said mounting box for the electrical wires connected to the electrical connector.

20. The mounting box of claim 14 molded from a polymeric material.

* * * * *